United States Patent [19]

Diehl et al.

[11] Patent Number: 5,266,454
[45] Date of Patent: Nov. 30, 1993

[54] SOLID PARTICLE DISPERSIONS OF FILTER DYES FOR PHOTOGRAPHIC ELEMENTS

[75] Inventors: Donald R. Diehl; Glenn M. Brown, both of Rochester, N.Y.

[73] Assignee: Eastman Kodak Company, Rochester, N.Y.

[21] Appl. No.: 24,564

[22] Filed: Mar. 1, 1993

Related U.S. Application Data

[63] Continuation of Ser. No. 733,930, Jul. 22, 1991, abandoned.

[51] Int. Cl.$^5$ .................................................. G03C 1/06
[52] U.S. Cl. ........................................ 430/522; 430/510
[58] Field of Search ............... 430/510, 517, 522, 581, 430/586

[56] References Cited

U.S. PATENT DOCUMENTS

| | | | |
|---|---|---|---|
| 4,358,521 | 11/1982 | Kondo et al. | 430/83 |
| 4,803,150 | 2/1989 | Dickerson et al. | 430/502 |
| 4,855,221 | 8/1989 | Factor et al. | 430/510 |
| 4,857,446 | 8/1989 | Diehl et al. | 430/510 |
| 4,861,700 | 8/1989 | Shuttleworth et al. | 430/517 |
| 4,900,652 | 2/1990 | Dickerson et al. | 430/502 |
| 4,900,653 | 2/1990 | Factor et al. | 430/522 |
| 4,923,788 | 5/1990 | Shuttleworth et al. | 430/507 |
| 4,940,654 | 7/1990 | Diehl et al. | 430/522 |
| 4,948,717 | 8/1990 | Diehl et al. | 430/510 |
| 4,948,718 | 8/1990 | Factor et al. | 430/522 |
| 4,950,586 | 8/1990 | Diehl et al. | 430/507 |
| 4,988,611 | 1/1991 | Anderson et al. | 430/494 |

FOREIGN PATENT DOCUMENTS

| | | |
|---|---|---|
| 0294099 | 5/1988 | European Pat. Off. |
| 0351593 | 6/1989 | European Pat. Off. |
| 0391405 | 10/1990 | European Pat. Off. |

OTHER PUBLICATIONS 85 193809 (C) WPIL/Derwent Week 8532.

Primary Examiner—Jack P. Brammer
Attorney, Agent, or Firm—Gordon M. Stewart

[57] ABSTRACT

Solid particle dispersions of dyes according to the formula:

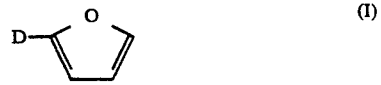

(I)

wherein D is selected from the group consisting of

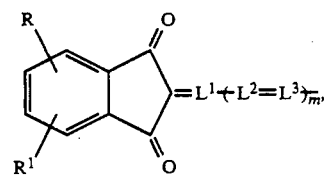

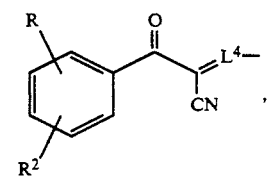

and

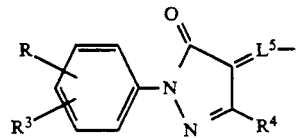

are disclosed as filter dyes for photographic elements. In this formula, $R^1$, $R^2$, $R^3$, and $R^4$ are each independently hydrogen, substituted or unsubstituted alkyl, or substituted or unsubstituted aryl. R is a carboxy or sulfonamido substituent. $L^1$ through $L^5$ are each independently substituted or unsubstituted methine groups, and m is 0 or 1. The dyes of the invention are particularly useful as filter dyes for light in the ultraviolet and short blue wavelength regions of the spectrum.

11 Claims, No Drawings

SOLID PARTICLE DISPERSIONS OF FILTER DYES FOR PHOTOGRAPHIC ELEMENTS

This is a continuation of application Ser. No. 07/733,930, filed Jul. 22, 1991 now abandoned.

This invention relates to dyes, particularly dyes useful as filter dyes, especially ultraviolet filter dyes in photographic elements.

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a region of the spectrum from reaching at least one of the radiation-sensitive layers of the element. Ultraviolet light absorbing filter dyes also help prevent exposure from static emissions which may occur during manufacturing and processing.

After processing of the element, however, the continued presence of colored filter dye may adversely affect the image quality of the photographic material. It is therefore desirable in many systems to use filter dyes that will be solubilized and removed or at least decolorized during photographic processing. Dyes that are easily solubilized, however, tend to wander throughout the photographic material during coating, adversely affecting the final image quality. While essentially colorless ultraviolet absorbing filter dyes are frequently retained in color photographic materials in order to stabilize image dyes, process removable ultraviolet/short blue filter dyes are desirable for many other applications, such as for use in the graphic arts materials described in U.S. Pat. No. 4,904,565 of Schmidt et al.

To prevent dye wandering, the dyes are often coated with a mordant to bind the dye in the layer in which it is coated. Dye mordants, while often useful, tend to either bind the dye too strongly, inhibiting solubilization of the dye during photographic processing, or too weakly, thus not preventing dye wandering. It has been especially difficult to find non-staining and non-wandering filter dyes which absorb light in the sub 400 nm wavelength region of the spectrum.

It would therefore be highly desirable to provide an ultraviolet/short blue wavelength filter dye for use in photographic elements that does not wander during coating without requiring a mordant, and which is fully solubilized during processing for decolorizing and/or removal.

U.S. Pat. Nos. 4,950,586, 4,948,718, 4,948,717, 4,940,654, 4,923,788, 4,900,653, 4,861,700, 4,857,446, and 4,855,221 disclose the use of various dyes in solid particle dispersions. These patents disclose that the use of solid particle dye dispersions allows for the coating of filter dyes which are immobile in coated acidic emulsion layers yet which can be fully removed during basic aqueous film or paper processing. While U.S. Pat. No. 4,923,788 discloses dyes similar to those of the present invention, none of these references disclose the specific dyes of the present invention.

U.S. Pat. No. 4,358,521 also discloses dyes similar to those of the present invention. The specific dyes of the invention are not disclosed, however, and there is no suggestion of the use of such dyes as filter dyes in photographic elements.

According to the invention, there is provided a photographic element having a layer comprising a hydrophilic binder and, as a filter dye, a solid particle dispersion of a compound having the formula:

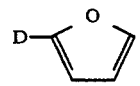
(I)

wherein: D is selected from the group consisting of

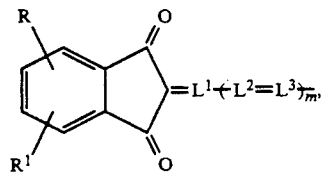

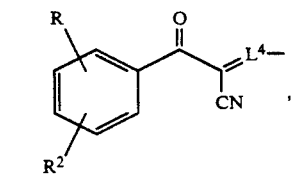

and

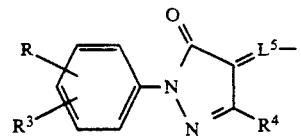

wherein
$R^1$, $R^2$, $R^3$, and $R^4$ are each independently hydrogen, substituted or unsubstituted alkyl, or substituted or unsubstituted aryl;

R is a carboxy or sulfonamido substituent;

$L^1$ through $L^5$ are each independently substituted or unsubstituted methine groups; and m is 0 or 1.

Solid particle dispersions of the compound of formula (I) are useful as filter dyes, alone or in combination with other filter dyes in photographic elements. They are insoluble at coating pH's of 6 or less (generally 4 to 6) and soluble at processing pH's of 8 or more (generally 8 to 12), so that they do not interact with other components of the photographic element, yet still are fully solubilized during photographic processing. A particular advantage of the dyes of the invention is that when in the form of solid particle dispersions, they generally exhibit absorbance maximums at wavelengths from about 350 nm to about 400 nm, making them effective filter dyes for light at ultraviolet and short blue wavelength regions of the spectrum.

$R^1$, $R^2$, $R^3$ and $R^4$ can be hydrogen, substituted or unsubstituted alkyl, or substituted or unsubstituted aryl. Preferably, these groups are each independently substituted or unsubstituted alkyl of 1 to 6 carbon atoms or substituted or unsubstituted aryl of 6 to 14 carbon atoms. The alkyl or aryl group may be substituted with any of a number of substituents as is known in the art, other than those, such as sulfo substituents, that would tend to increase the solubility of the dye so much as to cause it to become soluble at coating pH's. Examples of useful substituents include halogen, alkoxy, ester groups, amido, acyl, alkylamino, carboxy, and sulfonamido. Examples of alkyl groups include methyl, ethyl, n-propyl, isopropyl, n-butyl, isobutyl, n-pentyl, n-hexyl, or isohexyl. Examples of aryl groups include phenyl, tolyl, naphthyl, anthracenyl, pyridyl, and styryl.

$L^1$ through $L^5$ are substituted or unsubstituted methine groups, e.g. —$CR^5$=groups, where $R^5$ represents hydrogen or substituted or unsubstituted alkyl or substituted or unsubstituted aryl as described above for $R^1$-$R^4$.

Dyes of formula I include at least one carboxy or sulfonamido substituent R. Carboxy groups have the formula $CO_2H$ and sulfonamido groups have the formula $NHSO_2R^6$ where $R^6$ is substituted or unsubstituted alkyl or substituted or unsubstituted aryl as described above for $R^1$-$R^4$.

Examples of dyes according to formula (I) include the following:

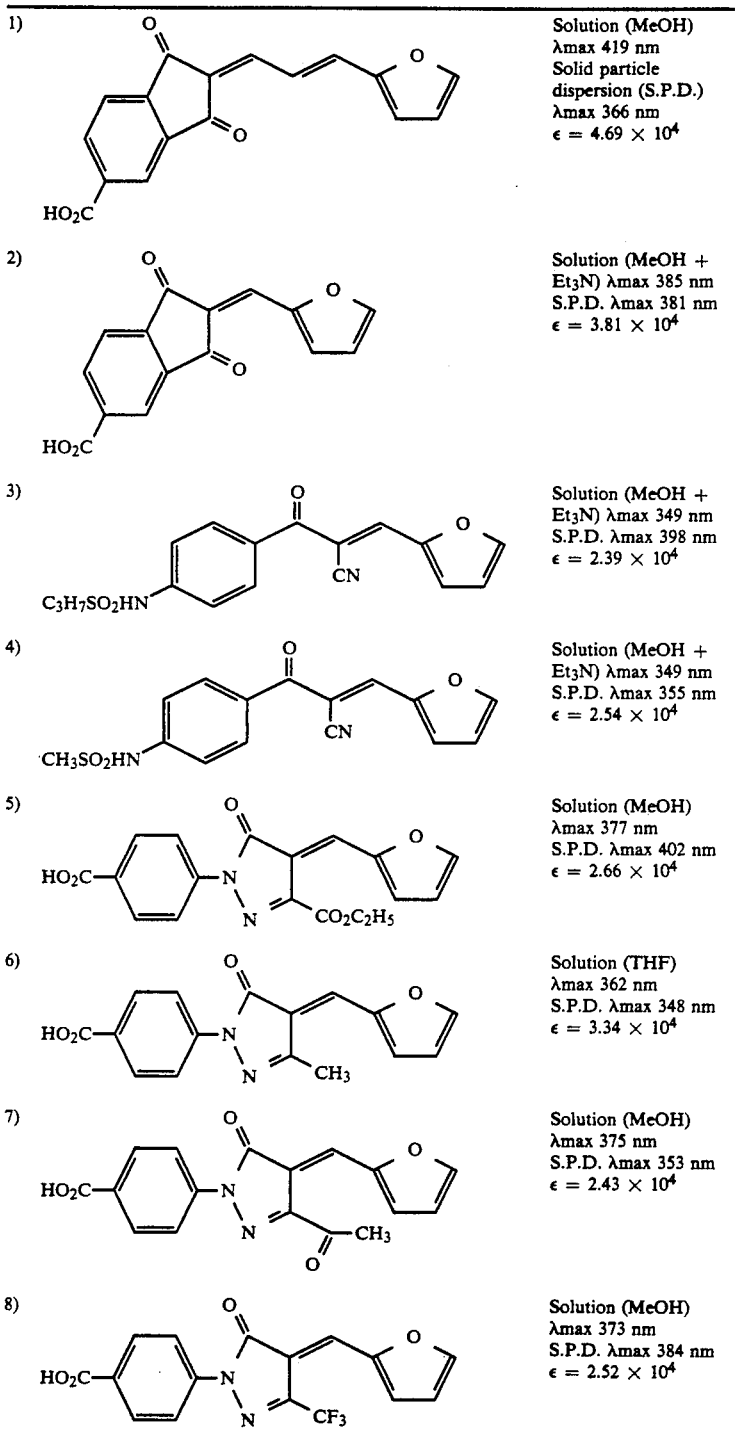

The dyes of formula (I) can be prepared by synthetic techniques well-known in the art, as illustrated by the synthetic examples below. Such techniques are further illustrated, for example, in "*The Cyanine Dyes and Related Compounds*", Frances Hamer, Interscience Publishers, 1964.

The dyes of formula (I) may be incorporated in a hydrophilic layer of a photographic element in any known way (e.g., with the aid of a high-boiling nonpolar organic solvent), but are preferably in the form of a solid particle dispersion (i.e., the dye is in the form of solid particles of microscopic size) for incorporation into a layer such as a hydrophilic colloid layer of a photographic element. The solid particle dispersion can be formed by precipitating the dye in the form of a dispersion and/or by well-known milling techniques, e.g., ball-milling, sand-milling, or colloid-milling (preferably ball- milling or sand-milling) the dye in the presence of a dispersing agent. The dispersion of dye particles should have a mean diameter of less than 10 $\mu$m and preferably less than 1 $\mu$m. The dye particles can be prepared in sizes ranging down to about 0.01 $\mu$m.

The dyes may be located in any layer of the element where it is desirable to absorb light, but it is particularly advantageous to locate them in a layer where they will be solubilized and washed out during processing. Particularly preferred locations are in a layer above a light sensitive layer, or on the backside of a clear support. Useful amounts of dye range from 1 to 1000 mg/m$^2$. The dye should be present in an amount sufficient to yield an optical density at the absorbance D-max before processing of at least 0.10 density units and preferably at least about 0.50 density units. This optical density will generally be less than 5.0 density units for most photographic applications.

The hydrophilic binder used in the present invention can be any known type, such as a hydrophilic colloid (e.g., gelatin), polyvinyl alcohol, and the like, as are well-known in the art.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymercoated paper. Such supports are described in further detail in *Research Disclosure*, December, 1978, Item 17643 [hereinafter referred to as *Research Disclosure*], Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, Light-Sensitive Systems: Chemistry and Application of Non-silver Halide Photographic Processes, J. Wiley & Sons, N.Y. (1965).

Silver halide is especially preferred as a radiation-sensitive material. Silver halide emulsions can contain, for example, silver bromide, silver chloride, silver iodide, silver chlorobromide, silver chloroiodide, silver bromoiodide, or mixtures thereof. The emulsions can include coarse, medium, or fine silver halide grains bounded by 100, 111, or 110 crystal planes. Silver halide emulsions and their preparation are further described in *Research Disclosure*, Section I. Also useful are tabular grain silver halide emulsions, as described in *Research Disclosure*, January, 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure*, Sections I–IV.

The dyes of the invention can be used as interlayer dyes, trimmer dyes, pelloid dyes, or antihalation dyes. They can be used to prevent crossover in X-ray materials as disclosed in U.S. Pat. Nos. 4,900,652 and 4,803,150 and European Patent Application Publication No. 0 391 405, to prevent unwanted light from reaching a sensitive emulsion layer of a multicolor photographic element as disclosed in U.S. Pat No. 4,988,611, and for other uses as indicated by the absorbance spectrum of the particular dye. The dyes can be used in a separate filter layer or as an intergrain absorber.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. Color photographic elements and colorforming couplers are well-known in the art and are further described in *Research Disclosure*, Section VII.

The element of the invention can also include any of a number of other well-known additives and layers, as described in *Research Disclosure*. These include, for example, optical brighteners, antifoggants, image stabilizers, light-absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and/or sulfite during photographic processing, so as to allow the dye to be solubilized and removed or decolorized .

The photographic elements of the invention, when exposed, can be processed to yield an image. During processing, the dye of formula (I) will generally be decolorized and/or removed. Following processing, the dye of the invention should contribute less than 0.10 density unit, and preferably less than 0.02 density unit to the absorbance D-max in the visible region in the minimum density areas of the exposed and processed element.

Processing can be by any type of known photographic processing, as described in *Research Disclosure*, Sections XIX–XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a nonchromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Examples.

Synthesis of Dye 1

A slurry of 3.9 grams (0.015 mol) 5-carboxy-2-ethoxycarbonyl-1,3-indandione, 2.5 grams (0.02 mol) 2-furanacrolein and 75 ml of glacial acetic acid was heated to reflux with constant stirring, and held at reflux for 30 minutes. The reaction color became brown and a tan-brown precipitate formed. After 30 minutes the flask was removed from the oil bath and slowly cooled to room temperature over 90 minutes with constant stirring. The precipitated reddish-brown product was collected and washed sequentially with acetic acid, ether and ligroin. The weight of dried product was 3.0 grams (67.9% yield) of pure dye 1, m.p. =285°-288° C. (decomp.). All analytical data were consistent with the structure.

Synthesis of Dye 3

A slurry of 5.0 grams (0.018 mol) 4-propylsulfonamidobenzoylacetonitrile, 2.41 grams (0.025 mol) furfural and 20 ml of glacial acetic acid was heated at reflux for three hours. The reaction was then filtered while hot and the filtrate was cooled to room temperature with stirring. The precipitated product was collected, washed with ether, then dried to give 4.60 grams of crude product. The dye was purified by recrystallization from 40 ml of glacial acetic acid by refluxing and allowing to slowly cool to room temperature. The precipitated product was collected and dried to give a weight of pure dye 2 of 3.11 grams (50.1% yield), m.p.=134°-136° C. All analytical data were consistent with the dye structure.

Synthesis of Dye 5:

A mixture of 8.29 grams (0.03 mol) 1-(4-carboxyphenyl)-3-ethoxycarbonyl-2-pyrazolin-5-one and 29.0 grams (0.03 mol) furfural was heated to 100° C. and stirred for 45 minutes. The black product mixture was cooled and poured into 100 ml of ethanol with rapid stirring. The precipitated brown solid product was collected and dried to afford 9.86 grams (92.8% yield) of crude dye 5. The dye was purified by recrystallization from 600 ml of refluxing glacial acetic acid with slow cooling to room temperature. The precipitated pure dye 5 was dried to give 4.52 grams (42.5% yield), m.p.=254°-255° C. (decomp). All analytical data were consistent with the structure.

Synthesis of Dye 8

A slurry of 5.44 grams (0.02 mol) 1-(4-carboxyphenyl)-3-trifluoromethyl-2-pyrazolin-5-one, 23.0 grams (0.239 mol) furfural, and 50 ml of glacial acetic acid was heated to 105° C. over a 30 minute period. The reaction was held at this temperature for 30 minutes and the color gradually became brown. After slowly cooling to room temperature the precipitated product was collected and dried to give 2.98 grams (42.5% yield) of crude dye 8. The dye was recrystallized once from 100 ml of refluxing glacial acetic acid, then finally slurried in xylene at room temperature. The resulting pure dye 8 product was collected and dried to afford 1.10 grams (15.7% yield) of fluffy orange crystals, m.p.=243° C. All analytical data were consistent with the dye structure.

Dye Wandering and Stain Evaluation Example

Dyes according to formula (I) were prepared as solid particle dispersions by ball-milling according to the following procedure. Water (21.7 ml) and a 6.7% solution of Triton X-200 ® surfactant (2.65 g) were placed in a 60 ml screw-capped bottle. A 1.00 g sample of dye was added to this solution. Zirconium oxide beads (40 ml, 2 mm diameter) were added and the container with the cap tightly secured was placed in a mill and the contents milled for four days. The container was removed and the contents added to a 12.5% aqueous gelatin (8.0 g) solution. The resulting mixture was filtered to remove the zirconium oxide beads. The resulting dye dispersion had a particle size mean diameter less than 1.0 μm.

The solid particle dispersions of these dyes were coated on a polyester support according to the following procedure. A spreading agent (surfactant 10G ®) and a hardener (bis(vinylsulfonylmethyl ether) were added to the dye-gelatin melt prepared as described above. A melt from this mixture was then coated on a poly(ethylene terephthalate) support to achieve a dye coverage of 0.27 g/m$^2$, a gelatin coverage of 1.61 g/m$^2$, a spreading agent level of 0.097 g/m$^2$, and a hardener level of 0.016 g/m$^2$. The absorbance of the dye dispersion was measured with a spectrophotometer. Identical elements were subjected to a 5 minute distilled water wash (2-3 gal/min flow rate), and to Kodak E-6 ® Processing (which is described in British Journal of Photography Annual. 1977, pp. 194-97) and the absorbance was measured for each. The results are shown in Table I.

TABLE I

| DYE | λ-max | D-max | D-max after Water Wash | D-max after E-6 ® Processing |
|---|---|---|---|---|
| 1 | 366 nm | 0.63 | 0.49 | 0.01 |
| 3 | 398 nm | 0.64 | 0.58 | 0.01 |
| 4 | 355 nm | 0.86 | 0.83 | 0.01 |
| 5 | 402 nm | 1.26 | 1.25 | 0.07 |
| 6 | 348 nm | 1.15 | 1.16 | 0.00 |

These results show that the dyes of formula (I) are not affected by the water wash, indicating no wandering at coating pH, but are fully solubilized for removal and/or decolorization during photographic processing. The dyes in the form of solid particle dispersions exhibit absorbance maximums at wavelengths from about 350 to 400 nm, making them effective filter dyes for light at ultraviolet and short blue wavelength regions of the spectrum.

The invention has been described in detail with reference to preferred embodiments thereof. It should be understood, however, that variations and modifications can be made within the spirit and scope of the invention.

We claim:

1. A photographic element comprising a support having thereon a radiation-sensitive layer and a hydrophilic layer, which is the same as or different from the radiation-sensitive layer, comprising a hydrophilic binder and a filter dye, wherein the filter dye has the formula:

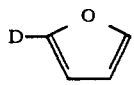
(I)

wherein: D is selected from the group consisting of

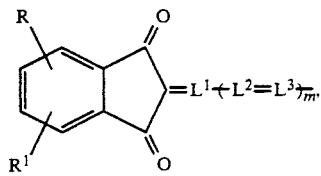

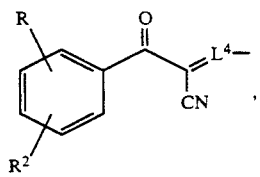

and

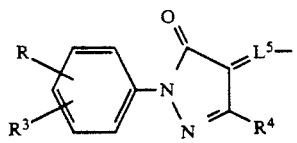

wherein

R$^1$, R$^2$, R$^3$, and R$^4$ are each independently hydrogen, substituted or unsubstituted alkyl or substituted or unsubstituted aryl;

R is a carboxy or sulfonamido substituent;

L$^1$ through L$^5$ are each independently substituted or unsubstituted methine groups; and m is 0 or 1.

2. A photographic element according to claim 1 wherein D is

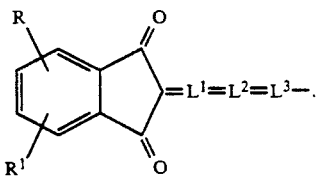

3. A photographic element according to claim 1 wherein D is

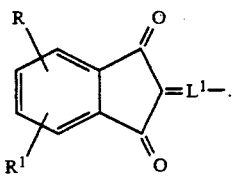

4. A photographic element according to claim 1 wherein D is

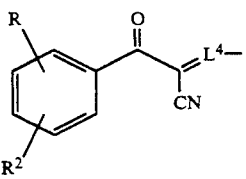

5. A photographic element according to claim 1 wherein D is

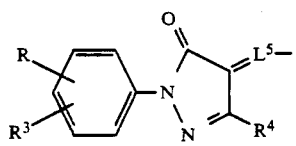

6. A photographic element according to claim 1 wherein the filter dye layer is a different layer than the radiation-sensitive layer on the same side of the support as the radiation-sensitive layer.

7. A photographic element according to claim 1 wherein the filter dye layer is a different layer than the radiation-sensitive layer on the opposite side of the support as the radiation-sensitive layer.

8. A photographic element according to claim 1 wherein said dye is in the form of a solid particle dispersion.

9. A photographic element according to claim 8 wherein the dispersion particles have a mean diameter of from about 0.01 to 10 μm.

10. A photographic element according to claim 8 wherein the filter dye layer is a different layer than the radiation-sensitive layer on the same side of the support as the radiation-sensitive layer.

11. A photographic element according to claim 8 wherein the filter dye layer is a different layer than the radiation-sensitive layer on the opposite side of the support as the radiation-sensitive layer.

* * * * *